US012658459B2

(12) United States Patent
Yu et al.

(10) Patent No.: US 12,658,459 B2
(45) Date of Patent: Jun. 16, 2026

(54) SYSTEMS AND METHODS FOR CONTROLLING THE THERMAL MANAGEMENT SYSTEM IN A FUEL CELL POWERTRAIN SYSTEM

(71) Applicant: CUMMINS INC., Columbus, IN (US)

(72) Inventors: Yongfei Yu, Dublin, CA (US); Archit N. Koti, Sunnyvale, CA (US); Patrick Kaufman, Vacaville, CA (US); Jairo Martinez Garcia, Albany, CA (US); Vivek Anand Sujan, Columbus, IN (US); Sagar Sharma, Irvine, CA (US)

(73) Assignee: CUMMINS INC., Columbus, IN (US)

( * ) Notice: Subject to any disclaimer, the term of this patent is extended or adjusted under 35 U.S.C. 154(b) by 832 days.

(21) Appl. No.: 18/062,366

(22) Filed: Dec. 6, 2022

(65) Prior Publication Data

US 2023/0187664 A1      Jun. 15, 2023

Related U.S. Application Data

(60) Provisional application No. 63/288,962, filed on Dec. 13, 2021.

(51) Int. Cl.
| | |
|---|---|
| *H01M 8/04223* | (2016.01) |
| *H01M 8/04007* | (2016.01) |
| *H01M 8/04029* | (2016.01) |
| *H01M 8/04225* | (2016.01) |
| *H01M 8/04302* | (2016.01) |
| *H01M 8/0432* | (2016.01) |
| *H01M 8/04537* | (2016.01) |
| *H01M 8/04701* | (2016.01) |
| *H01M 8/04858* | (2016.01) |
| *H01M 10/44* | (2006.01) |
| *H01M 10/615* | (2014.01) |
| *H01M 10/625* | (2014.01) |
| (Continued) | |

(52) U.S. Cl.
CPC ... *H01M 8/04268* (2013.01); *H01M 8/04029* (2013.01); *H01M 8/04074* (2013.01); *H01M 8/04225* (2016.02); *H01M 8/04302* (2016.02); *H01M 8/0432* (2013.01); *H01M 8/04626* (2013.01); *H01M 8/04723* (2013.01); *H01M 8/04947* (2013.01); *H01M 10/446* (2013.01); *H01M 10/615* (2015.04); *H01M 10/625* (2015.04); *H01M 10/63* (2015.04); *H01M 16/006* (2013.01); *H01M 2220/20* (2013.01); *H01M 2250/20* (2013.01)

(58) Field of Classification Search
CPC ......... H01M 8/04268; H01M 8/04074; H01M 8/07723; H01M 8/04626; H01M 8/0432; H01M 8/04947; H01M 8/04225; H01M 8/04302; H01M 8/04029; H01M 10/446; H01M 10/615; H01M 10/625; H01M 10/63
See application file for complete search history.

(56) References Cited

U.S. PATENT DOCUMENTS

| | | | |
|---|---|---|---|
| 9,034,532 B2 | 5/2015 | Sung et al. | |
| 10,170,778 B2 | 1/2019 | Kim et al. | |

FOREIGN PATENT DOCUMENTS

| | | |
|---|---|---|
| JP | H0722052 | 3/1995 |
| KR | 20190064739 | 6/2016 |
| (Continued) | | |

*Primary Examiner* — Sarah A. Slifka
(74) *Attorney, Agent, or Firm* — Barnes & Thornburg LLP

(57) ABSTRACT

The present disclosure generally relates to systems and methods for controlling a thermal management system of a fuel cell powertrain system.

11 Claims, 7 Drawing Sheets

(51) Int. Cl.
    *H01M 10/63*       (2014.01)
    *H01M 16/00*       (2006.01)

(56)              References Cited

FOREIGN PATENT DOCUMENTS

| | | |
|---|---|---|
| KR | 101923893 | 2/2019 |
| WO | 2010/063361 | 6/2010 |

12,20

24  22  26        44      28,30    42
                          36   52

24  22  26

SYSTEMS AND METHODS FOR CONTROLLING THE THERMAL MANAGEMENT SYSTEM IN A FUEL CELL POWERTRAIN SYSTEM

CROSS-REFERENCE TO RELATED APPLICATIONS

This non-provisional application claims the benefit and priority, under 35 U.S.C. § 119(e) and any other applicable laws or statutes, to U.S. Provisional Patent Application Ser. No. 63/288,962 filed on Dec. 13, 2021, the entire disclosure of which is hereby expressly incorporated herein by reference.

TECHNICAL FIELD

The present disclosure generally relates to systems and methods for controlling a thermal management system of a fuel cell powertrain system.

BACKGROUND

A typical fuel cell powertrain system comprises more than one power source. For example, the power sources of a fuel cell powertrain system may comprise one or more fuel cell systems and/or one or more high voltage battery systems or packs. In most mobility applications the reactants supplied to the fuel cell system are pure hydrogen for the anode and an oxidant for the cathode. The source of oxygen, which reacts at the cathode, is atmospheric air. As such, oxygen is often accompanied with nitrogen. The anode is typically supplied with pure hydrogen gas that is stored as highly compressed hydrogen gas or liquefied hydrogen in tanks. A coolant is often required to provide a heat sink for any heat rejection during the electrochemical reactions and to keep the fuel cell at an appropriate temperature during operation.

A fuel cell system typically cannot start in cold temperature conditions. A fuel cell system may require a heating assist system that can warm up and raise the temperature of the fuel cell system above freezing. For example, the temperature of the fuel cell system may be raised from about 2° C. to about 10° C. Once a fuel cell system starts operating, it may reject heat and that rejected heat may be used to heat the coolant further. A heating bypass may be configured and controlled to allow for heating of the entire coolant volume.

A thermal management system comprising radiators, pumps, fans, heaters, and/or other components may be used to ensure that the fuel cell system is at an appropriate temperature before operating. Such a thermal management system may be used to operate each of the fuel cell systems in a fuel cell powertrain system independently. The thermal management system may be controlled before, during, and after operation of the fuel cell systems in the fuel cell powertrain system.

Described herein are systems and methods for controlling, determining, optimizing, implementing, and/or improving the thermal management system of a fuel cell powertrain system. Described herein are methods, processes, strategies, algorithms, and/or embodiments that may decrease the time needed to start up and/or start operating a fuel cell system under cold weather conditions. Described herein are methods, processes, strategies, algorithms, and/or embodiments that may decrease the size and number of components in the thermal management system of a fuel cell powertrain system. Described herein are methods, processes, strategies, algorithms, and/or embodiments that may ensure that the coolant temperature in the fuel cell powertrain system is and remains within system tolerance limits.

SUMMARY

Embodiments of the present invention are included to meet these and other needs.

One aspect of the present disclosure, described herein, is a method of heating a fuel cell system in a fuel cell powertrain system comprising a thermal management system. The method includes the steps of identifying the need to heat the fuel cell system by a system controller or by one or more fuel cell sub-system controllers that communicate with each other, identifying the state-of-charge in a battery comprised in the fuel cell powertrain system, heating coolant associated with the fuel cell system by a heater, and decreasing the time to heat the fuel cell system.

In some embodiments, identifying the need to heat the fuel cell system may include determining the ambient temperature. In some embodiments, identifying the need to heat the fuel cell system may be automatic. In some embodiments, identifying the need to heat the fuel cell system comprises a remote warm-up feature. In some embodiments, heating the fuel cell system may include maintaining a charge sustaining state-of-charge in the battery.

In some embodiments, heating the fuel cell system may include heating the battery. In some embodiments, heating the coolant associated with the fuel cell system may include the system controller closing one or more battery contactors to allow high voltage electricity to flow through the powertrain. In some embodiments, heating the fuel cell system may include the system controller commanding a battery warm-up system to regulate temperature.

In some embodiments, heating the fuel cell system may include disabling a traction system in the fuel cell powertrain system if the state-of-charge in the battery is not low. In some embodiments, heating the fuel cell system may include the system controller not starting the fuel cell system if the state-of-charge in the battery is not low.

In some embodiments, heating the fuel cell system may include supplementing battery state-of-charge if the state-of-charge in the battery is low. In some embodiments, the fuel cell powertrain system may include more than one fuel cell system and one heater. In some embodiments, heating the fuel cell system may include heating coolant associated with the first fuel cell system by the heater and operating the first fuel cell system when the temperature of the coolant is about 2° C. to about 10° C., including any specific or range of temperatures comprised therein. In some embodiments, operating the first fuel cell system may include using heat rejected by the first fuel cell system for heating coolant associated with a second fuel cell system through a heat exchanger.

A second aspect of the present invention relates to a fuel cell powertrain system having more than one fuel cell system, one heater, at least one heat exchanger, and a thermal management system. In the second aspect of the present invention, a first fuel cell system is associated with a first coolant and a second fuel cell system is associated with a second coolant. In some embodiments, the heat generated from operating the first fuel cell system may be used to heat the second fuel cell system during cold start. In some embodiments, a heat exchanger may be used to heat the second fuel cell system. In the second aspect of the present invention, the fuel cell powertrain system may include a battery pack.

In some embodiments, the thermal management system may include a radiator and a polisher. In some embodiments, the thermal management system may include a pump which, when turned on, may allow the powertrain system to achieve a desired flow rate. In some embodiments, the thermal management system may include a coolant reservoir for storing coolant. In some embodiments, the thermal management system may include a second heat exchanger.

These and other features, aspects, and advantages of the present invention will become better understood when the following detailed description is read with reference to the accompanying drawings described herein. Reference is also made to the accompanying drawings that form a part hereof and in which is shown by way of illustration specific embodiments in which the invention may be practiced. These embodiments are described in sufficient detail to enable those skilled in the art to practice what is claimed and it is to be understood that other embodiments may be utilized and that logical, mechanical, and electrical changes may be made without departing from the spirit and scope of the claims. The following detailed description is, therefore, not to be taken in a limiting sense.

DETAILED DESCRIPTION

Figure 1A:
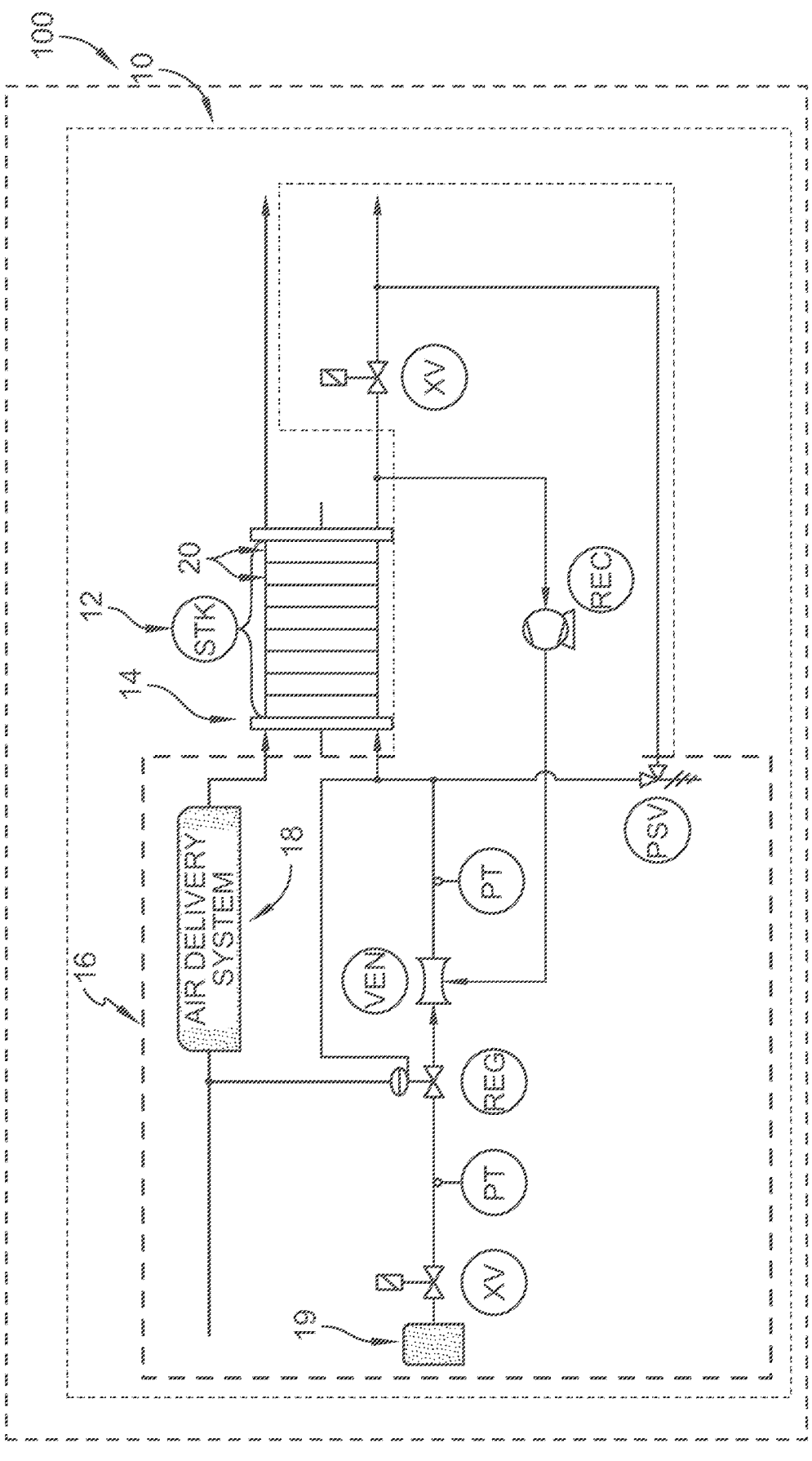
FIG. 1A is a schematic view of an exemplary fuel cell system including an air delivery system, an electrolyzer, and a fuel cell module including a stack of multiple fuel cells.
Figures 1B, 1C:
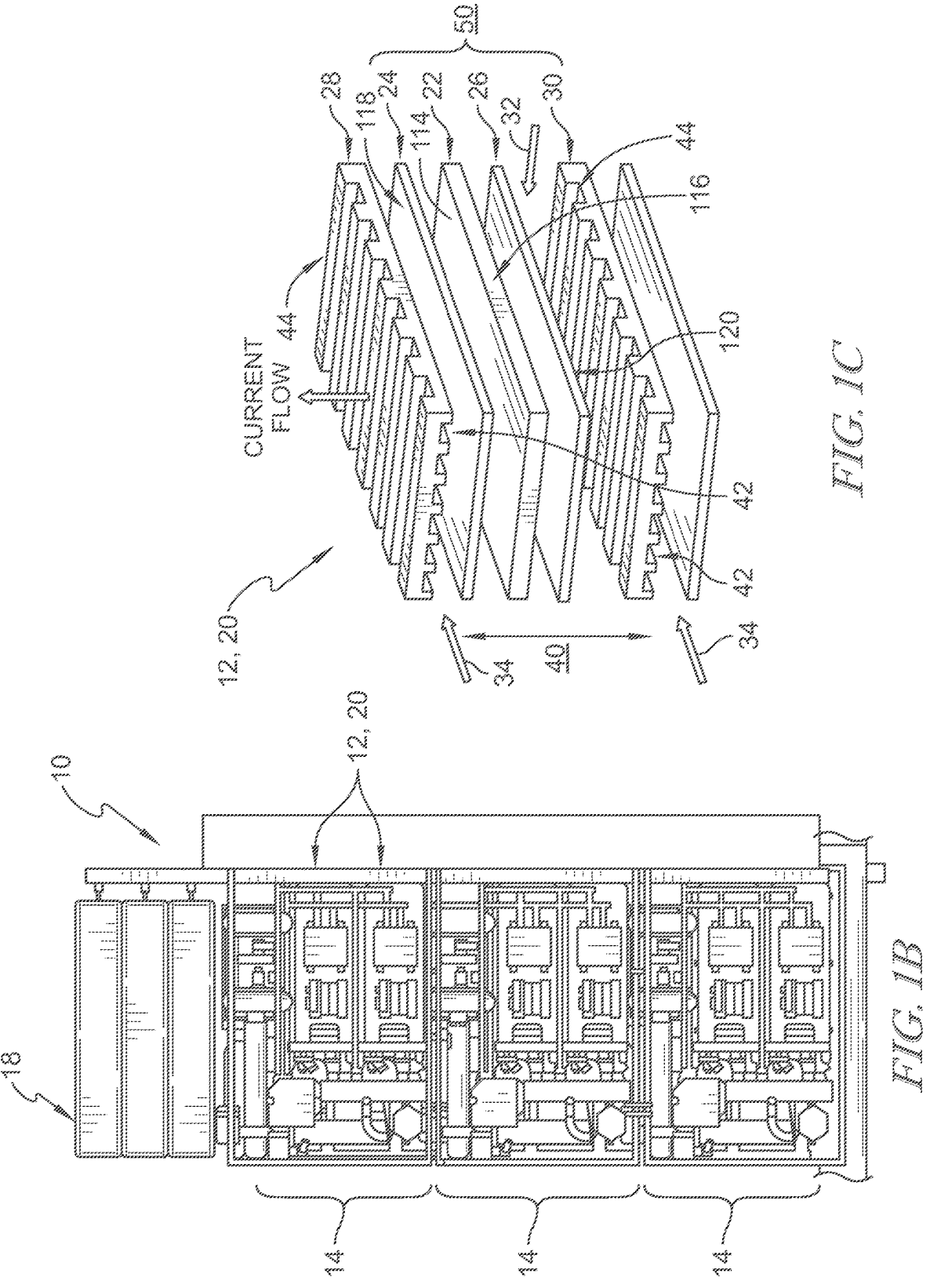
FIG. 1B is a cutaway view of an exemplary fuel cell system including an air delivery system, an electrolyzer, and a plurality of fuel cell modules each including multiple fuel cell stacks.
FIG. 1C is a perspective view of an exemplary repeating unit of a fuel cell stack of the fuel cell system of FIG. 1A.

As shown in FIG. 1A, fuel cell systems 10 often include one or more fuel cell stacks 12 or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with a source of hydrogen 19 such as a pressurized tank, including a gaseous pressurized tank, cryogenic liquid storage tank, chemical storage, physical storage, stationary storage, or electrolyzers. In one embodiment, the fuel cell system 10 is connected and/or attached in series or parallel to a source of hydrogen 19, such as one or more sources of hydrogen 19 in the BOP 16 (see FIG. 1A). In another embodiment, the fuel cell system 10 is not connected and/or attached in series or parallel to a source of hydrogen 19.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

The present disclosure is directed to systems and methods for controlling, determining, optimizing, implementing, and/or improving a thermal management system of a fuel cell powertrain system. More specifically, the present disclosure is directed to methods, processes, strategies, algorithms, and/or embodiments that may decrease the time needed to start operating a fuel cell system under cold weather conditions, and/or decrease the size and number of components in the thermal management system of a fuel cell powertrain system. The present disclosure is also directed to methods, processes, strategies, algorithms, and/or embodiments that may ensure that the coolant temperature in the fuel cell powertrain system is within system tolerance limits.

In one embodiment, the fuel cell powertrain systems described herein, may be used in a vehicle. A vehicle comprising the present fuel cell powertrain systems may be an automobile, a pass car, a bus, a truck, a train, a locomotive, an aircraft, a light duty vehicle, a medium duty vehicle, or a heavy duty vehicle. In some embodiments, the fuel cell powertrain systems described herein may be used in vehicles used on roadways, highways, railways, airways, and/or waterways. In other embodiments, the fuel cell powertrain systems described herein may be used in other applications including but not limited to off highway vehicles, bobtails, mining equipment, stationary power systems, and/or electrolyzers.

Figure 2:
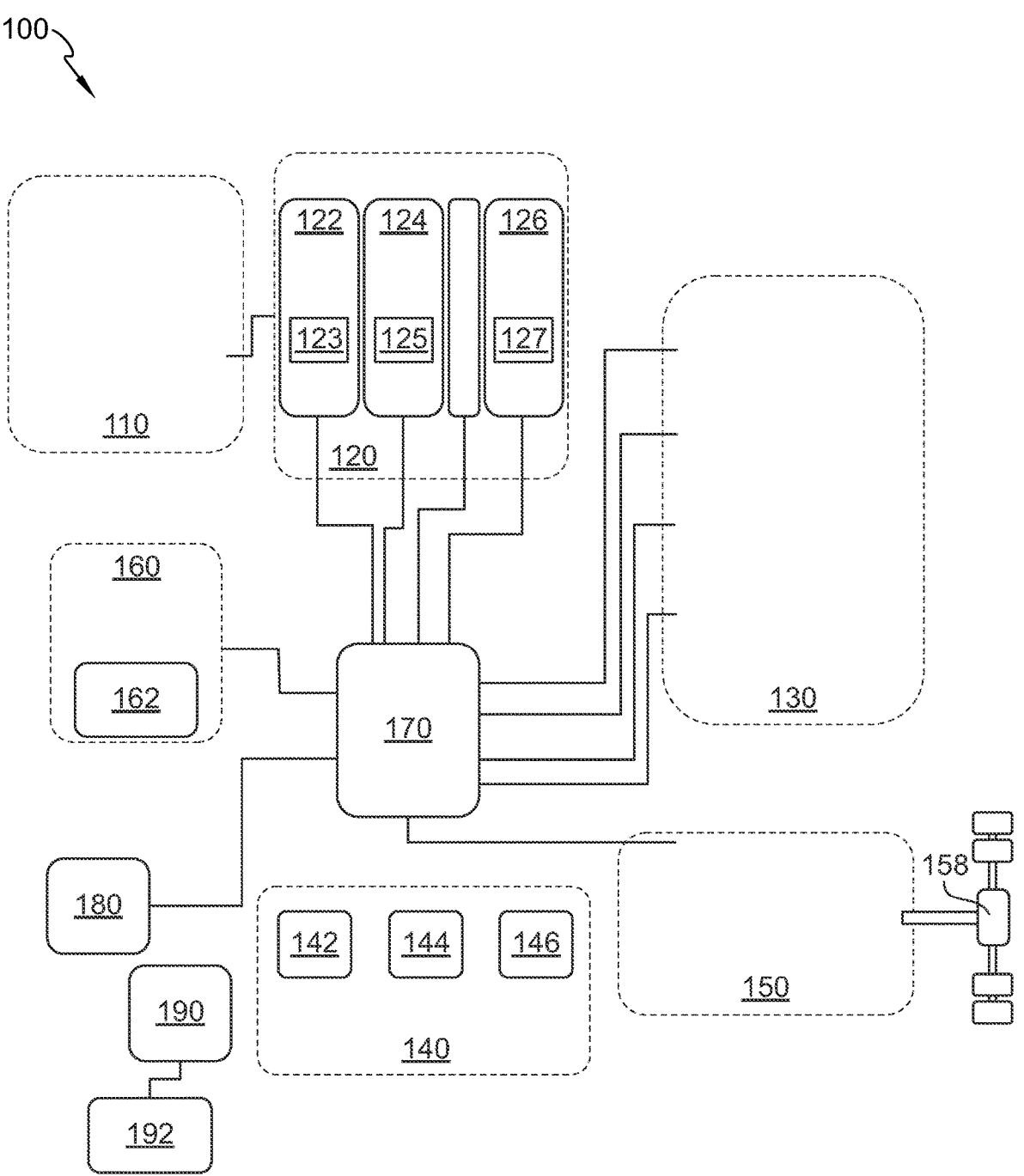
FIG. 2 is a schematic showing one embodiment of a fuel cell powertrain system of the present disclosure.

Referring to FIG. 2, a fuel cell powertrain system 100 may be powered by one or more of any type of a power source. A power source of the present method or system may include but is not limited to an engine (e.g., an internal combustion engine (ICE), a diesel engine, a hydrogen powered engine, etc.), a fuel cell or a fuel cell stack, and/or a high voltage battery. A typical fuel cell powertrain system may comprise more than one power source. An exemplary power source may include at least one fuel cell system and at least one high voltage battery pack.

A typical fuel cell powertrain system is shown in FIG. 2. A fuel cell powertrain system 100 typically comprises a fuel cell system component 120 and a high voltage battery system component 160. In one embodiment, the fuel cell system component 120 may comprise one fuel cell system or sub-system 122. In other embodiments, the fuel cell system component 120 may comprise more than one fuel cell systems or sub-systems. For example, in some embodiments, the fuel cell system component 120 may comprise about two (2) to about ten (10) or more fuel cell systems or fuel cell sub-systems, including any specific number or range comprised therein. In one illustrative embodiment, the fuel cell system component 120 may comprise three fuel cell systems or sub-systems 122, 124, 126.

In one embodiment, the high voltage battery system component 160 may comprise one or more high voltage battery packs, including any number of battery packs comprised therein, such as 1, 2, 3, or more high voltage battery packs. In one illustrative embodiment, the high voltage battery system component 160 may comprise one high voltage battery pack 162. In another embodiment, the high voltage battery pack is one that maintains about 500V to about 800V on the high voltage, including any specific or range of voltage comprised therein.

In some embodiments, the fuel cell powertrain system 100 may comprise more than one fuel cell system in the fuel cell system component 120. In another embodiment, the fuel cell powertrain system 100 may not comprise a high voltage battery system component 160. In a further embodiment, the fuel cell powertrain system 100 may comprise power sources, such as a diesel engine and/or a hydrogen powered engine, in addition to the fuel cell system component 120 and/or the high voltage battery system component 160.

In one embodiment, the fuel cell powertrain system 100 may further comprise a hydrogen storage system 110, an accessory system 130, a thermal management system 140, a traction system 150, a high voltage power distribution unit 170, an onboard charger 180, and a system controller 190. In some embodiments, the accessory system 130 and the driver demand (e.g., the load demanded by the driver) may comprise the load (e.g., the total load) of the fuel cell powertrain system 100. In other embodiments, the fuel cell powertrain system 100 may comprise lesser or fewer components or additional fuel cell powertrain components as indicated in FIG. 2.

In one embodiment, the thermal management system 140 may comprise one or more cooling loops. For example, the thermal management system 140 may comprise 1-10 cooling loops, including any specific number or range of cooling loops comprised therein, depending on number of fuel cell sub-systems. The cooling loops function to regulate the temperature of the coolant. The cooling loops may cool or reduce the heat of the coolant. In one illustrative embodiment, the thermal management system 140 may comprise three cooling loops 142, 144, 146 as shown in FIG. 2. In some embodiments, the thermal management system 140 may comprise lesser or fewer components or more additional cooling loop components. For example, in other embodiments, the thermal management system 140 may comprise lesser or fewer cooling loops 142, 144, 146 or more cooling loops 142, 144, 146.

In one embodiment, the one or more cooling loops 142, 144, 146 in the thermal management system 140 may comprise one or more means of cooling. Embodiments for a means of cooling used in the one or more cooling loop may include, but are not limited to, one of more fans (not shown), one or more chillers (not shown), and/or one or more pumps (not shown), or combinations thereof. In other embodiments, one or more cooling loops 142, 144, 146 in the thermal management system 140 may comprise lesser or fewer components or additional means of cooling components.

In some embodiments, the high voltage power distribution unit 170 may comprise of junction boxes, fuses, etc. Each component functions in the high voltage power distribution unit 170 as known in the art. In other embodiments, the onboard charger 180 may comprise power electronics and other components such as controllers, plug in ports, etc. for AC charging of the high voltage (HV) batteries. Each component functions in the onboard charger 180 as known in the art.

Referring to FIG. 2, in one embodiment, the system controller 190 may implement one or more methods, processes, strategies, and/or algorithms to regulate the temperature of the fuel cell systems or sub-systems 122, 124, 126 and/or the battery pack 162 comprised in the fuel cell powertrain system 100. Specifically, the system controller 190 may control and/or regulate the temperature and flow of the coolant in the fuel cell systems or sub-systems 122, 124, 126.

In one embodiment, each fuel cell system or sub-system 122, 124, 126 may comprise a fuel cell system or sub-system controller 123, 125, 127 that may communicate with other fuel cell system or sub-system controllers 123, 125, 127. In some embodiments, each fuel cell system or sub-system controller 123, 125, 127 in each fuel cell system or sub-system 122, 124, 126 may implement one or more methods, processes, strategies, and/or algorithms to regulate the temperature of the fuel cell sub-systems 122, 124, 126 respectively. Specifically, the fuel cells systems or sub-systems 122, 124, 126 may control and/or regulate the temperature and flow of the coolant in their respective fuel cell systems or sub-systems 122, 124, 126.

In one illustrative embodiments, the system controller 190 may implement one or more methods, processes, strategies, or algorithms generated by a processor 192. In other embodiments, each fuel cell system or sub-system controller 123, 125, 127 in fuel cell system or sub-system 122, 124, 126 may implement one or more methods, processes, strategies, or algorithms generated by a processor 192. The methods, processes, strategies, or algorithms may regulate the temperature of the fuel cell systems or sub-systems 122, 124, 126 and/or the battery pack 162 in the fuel cell powertrain system 100. The method, process, strategy, and/or algorithm may determine, optimize, control, and/or regulate the temperature and flow of the coolant in the fuel cell system or sub-system 122, 124, 126.

Coolant flow and/or temperature regulation may have a direct impact on the life, health, and/or degradation of the fuel cell systems or sub-systems 122, 124, 126. In one embodiment, the fuel cell powertrain system 100 may comprise one or more thermal management loops (not shown). A thermal management loop may comprise elements of a cooling loop 142, 144, 146 and a fuel cell system or sub-system 122, 124, 126. In other embodiments, a thermal management loop may comprise lesser or fewer components or additional thermal management loop components.

Figure 3:
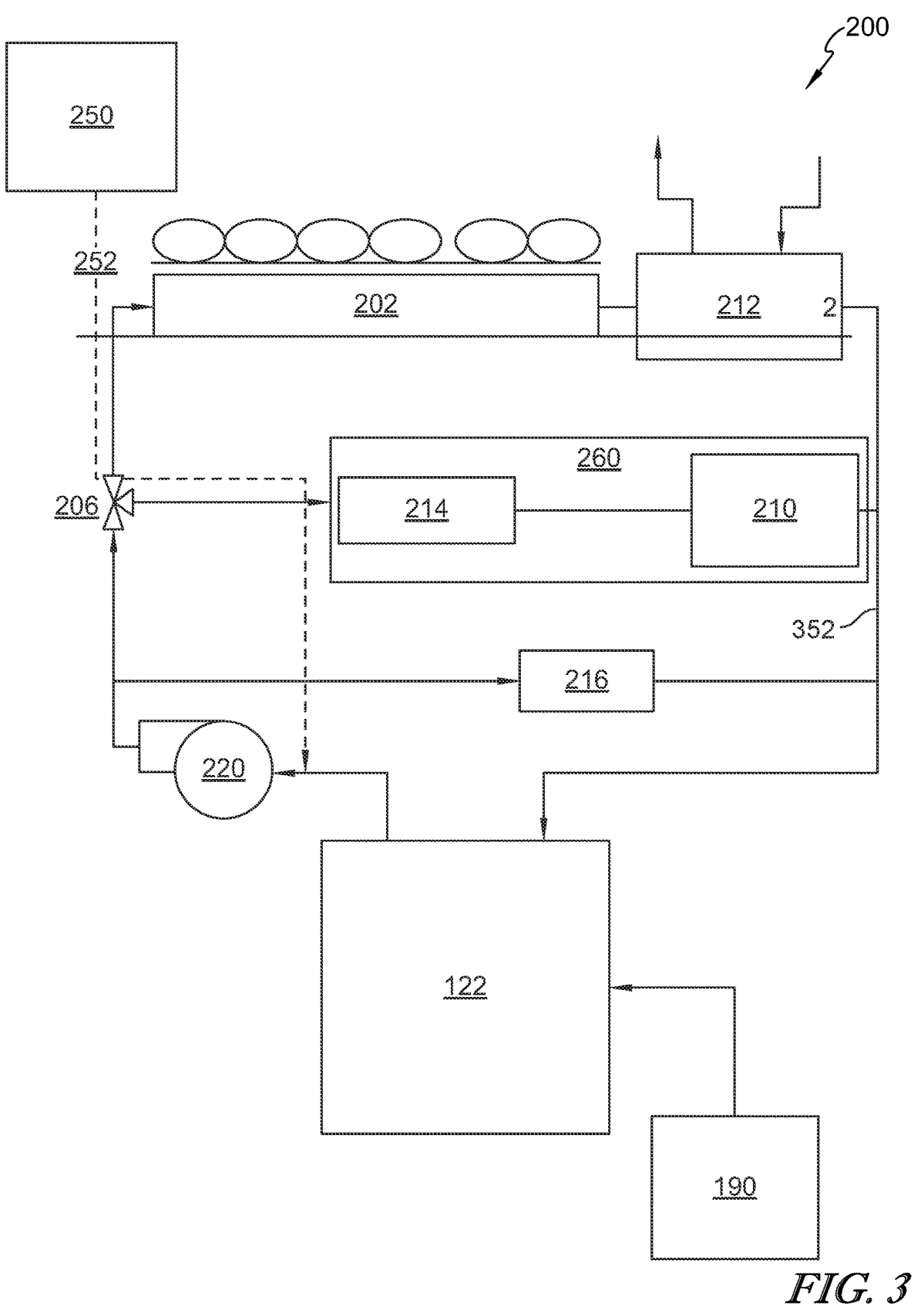
FIG. 3 is a schematic showing one embodiment of a thermal management loop in a fuel cell powertrain system.

One embodiment of a thermal management loop 200 comprising the fuel cell system or sub-system 122 in a fuel cell powertrain system 100 is shown in FIG. 3. The thermal management loop 200 comprises a heater 214, a radiator 202, a valve 206, a polisher 216, a heat exchanger 210, a pump 220, and a coolant reservoir 250 storing coolant 252, and/or a second heat exchanger 212. Each component may function in the thermal management loop 200 as known in the art.

In some embodiments, the thermal management loop 200 may comprise more than one heater 214, more than one radiator 202, more than one valve 206, more than one polisher 216, more than one heat exchanger 210, more than one pump 220, or more than one coolant reservoir 250 storing coolant 252. In other embodiments, the thermal management loop 200 may comprise less components or additional thermal management loop 200 components.

In the embodiments shown in FIG. 3, the thermal management of a fuel cell system or sub-system 122 in a fuel cell powertrain system 100 may encounter challenges in sizing and/or packaging the radiator 202. A fuel cell system or sub-system 122 may reject heat through the coolant 252 associated with the fuel cell system or sub-system 122. The temperature of the coolant 252 in the fuel cell system or sub-system 122 is relatively closer to ambient temperature (e.g., at or about 15° C. to about 25° C.) and much lower than the temperature of any coolant in systems comprising a diesel engine (e.g., at or about 75° C. to about 105° C.). Thus, large radiators 202 with powerful fans may be needed to achieve the required heat transfer, rejection, and/or reduction from the fuel cell system.

As shown in FIG. 3, the thermal management loop 200 of a fuel cell system or sub-system 122 may encounter challenges during a cold start. A cold start comprises starting a fuel cell system or sub-system 122 in cold weather conditions (e.g., at or below 0° C. to about 10° C.), in low temperature conditions (e.g., at or below 10° C. to about 25° C.), and/or when the surrounding or ambient temperature is below freezing (e.g., at or below about 0° C., at or below about −20° C.). In some embodiments, the fuel cell system or sub-system 122 may not begin operating in freezing temperatures and may need to be kept at or heated to a temperature above about 0° C. In some embodiments, a heating assist system 260 comprising a heat exchanger 210 and/or a heater 214 may be used to heat a volume of the coolant 252 to a temperature above about 0° C. (e.g., ranging from about 1° C. to 1000° C. including, any specific or range of temperatures comprised therein). In turn, raising the coolant temperature also raises the temperature of the fuel cell system or sub-system 122 to above about 0° C.

A second heat exchanger 212 may be directly and/or indirectly connected to the first heat exchanger 210. In some embodiments, the second heat exchanger 212 may be connected upstream or downstream of the first heat exchanger 210. The second heat exchanger 212 may also be utilized to further raise the temperature of the coolant 252 to a higher temperature (e.g., significantly above 0° C., such as to an fuel cell operational temperature ranging from about 600° C. to 1000° C. depending on the type of fuel cell utilized in the system) and/or at an increased rate (e.g., at least twice as fast as the first heat exchanger 210 alone) than the first heat exchanger 210 alone. Therefore, the second heat exchanger 212 may provide advantageous heating of the coolant, particularly during a cold start of the fuel cell systems or sub-systems.

Referring to FIGS. 2 and 3, once the fuel cell system or sub-system 122 starts or begins operating, the fuel cell system or sub-system 122 may reject heat. The rejected heat may be used to further increase the temperature of the coolant 252. In some embodiments, after the temperature of the coolant 252 is increased to about 1° C. to about 10° C., including any specific temperature or range comprised therein, a heating bypass may be used and/or controlled to allow the heated coolant to increase the temperature of the entire coolant volume in the coolant circuit comprising the coolant 252 and the coolant reservoir 250.

In one embodiment, the thermal management loop 200 in the fuel cell powertrain system 100 comprising the fuel cell system or sub-system 122 may further comprise a battery pack 162. In some embodiments, the time required for cold start (e.g., the time required to start operating the fuel cell system or sub-system 122 during cold weather conditions) may depend on the size of the heater 214 and/or the available battery power in the battery pack 162 of the fuel cell powertrain system 100.

In one embodiment, the heater 214 may be powered by the battery pack 162. In some embodiments, the battery pack 162 may also need to be at a minimum temperature (e.g., minimum temperature may be about 10° C.) to be able to provide power to heat the fuel cell system or sub-system 122. In some embodiments, an operator or user may initiate the operation of the fuel cell system or sub-system 122 by switching on the fuel cell powertrain system 100. In other embodiments, if the battery pack 162 needs to be heated to the minimum temperature to be able to heat the fuel cell system or sub-system 122, there may be an considerably increase in the time required to start operating the fuel cell system or sub-system 122 after an operator or user switches on the fuel cell powertrain system 100.

Various methods, processes, strategies, algorithms, and/or embodiments may be configured, used, or designed to reduce the time needed to start the fuel cell system or sub-system 122 in cold weather conditions and/or to efficiently operate the thermal management system 140 in the fuel cell powertrain system 100 (see FIG. 3). In one embodiment, the system controller 190 or the one or more fuel cell system or sub-system controllers 123, 125, 127 may initiate the heating of the coolant 252 when the fuel cell powertrain system 100 is not operating so that the fuel cell system or sub-system 122 can be kept warm and start operating when an operator or user switches on the fuel cell powertrain system 100.

Maintaining the fuel cell system or sub-system 122 at a temperature higher than freezing temperature may reduce the time needed to start operating the fuel cell system or sub-system 122 after an operator switches on the fuel cell powertrain system 100. In some embodiments, the system controller 190 or the one or more fuel cell system or sub-system controllers 123, 125, 127 may initiate the heating of the coolant 252 during the night, when the fuel cell powertrain system 100 is keyed off, or when the fuel cell powertrain system 100 is shut down or stopped.

In the embodiments shown in FIGS. 2 and 3, the system controller 190 or the one or more fuel cell system or sub-system controllers 123, 125, 127 may automatically identify the need to initiate heating of the coolant 252 based on a temperature sensor (not shown). In some embodiments, the system controller 190 or the one or more fuel cell system or sub-system controllers 123, 125, 127 may identify the need to initiate heating of the coolant 252 after direct input from an operator or user. In other embodiments, the system controller 190 or the one or more fuel cell system or sub-system controllers 123, 125, 127 may identify the need to initiate heating of the coolant 252 after a predetermined input from an operator or user is received by the system controller 190 or the one or more fuel cell system or sub-system controllers 123, 125, 127.

In one embodiment, a user or operator of the system controller 190 or the one or more fuel cell system or sub-system controllers 123, 125, 127 may set up a start time to initiate temperature calibration for the fuel cell powertrain system 100. In some embodiments, the system controller 190 or the one or more fuel cell system or sub-system controllers 123, 125, 127 may use a real-time clock, to initiate temperature calibration about 30 min to about 60 min ahead of time. In other embodiments, the system controller 190 or the one or more fuel cell system or sub-system controllers 123, 125, 127 may initiate temperature calibration through a remote a warm-up feature.

In one embodiment, the warm up remote feature may comprise the system controller 190 or the one or more fuel cell system or sub-system controllers 123, 125, 127 receiving wireless commands for remote warm up from a remote computer system operating one or more management software or receiving commands from an external controller. The system controller 190 or the one or more fuel cell system or sub-system controllers 123, 125, 127 may receive such commands through Wifi, Bluetooth, or other means. In other embodiments, the warm up remote feature may comprise the system controller 190 or the one or more fuel cell system or sub-system controllers 123, 125, 127 receiving commands for remote warm up from a user or an operator through a mobile application or web. In some other embodiments, the warm up remote feature may allow an operator or a user to command warm up of the fuel cell powertrain system 100 without having to be in the vehicle comprising the fuel cell powertrain system 100.

Temperature calibration of the fuel cell powertrain system may comprise heating the battery pack 162, the fuel cell system or sub-system 122, and/or the coolant 252. In some embodiments, the system controller 190 or the one or more fuel cell system or sub-system controllers 123, 125, 127 may initiate temperature calibration through an electronic device such as a phone, a computer, an iPad or some other device. In some embodiments, the system controller 190 or the one or more fuel cell system or sub-system controllers 123, 125, 127 may initiate temperature calibration through an application over the internet or through a web-portal.

In the embodiment shown in FIG. 3, the system controller 190 or the one or more fuel cell system or sub-system controllers 123, 125, 127 may initiate heating the cabin of the fuel cell powertrain system 100. In some embodiments, the system controller 190 or the one or more fuel cell system or sub-system controllers 123, 125, 127 may initiate heating the cabin of the fuel cell powertrain system 100 through an electronic device such as a phone, a computer, an iPad or some other device. In some embodiments, the system controller 190 or the one or more fuel cell system or sub-system controllers 123, 125, 127 may initiate heating the cabin of the fuel cell powertrain system 100 through an application over the internet or through a web-portal. In other embodiments, the system controller 190 or the one or more fuel cell system or sub-system controllers 123, 125, 127 may initiate heating the cabin of the fuel cell powertrain system 100 based on measurements made by a temperature sensor in the cabin.

In one embodiment, the system controller 190 or the one or more fuel cell system or sub-system controllers 123, 125, 127 may identify and/or determine if the ambient temperature is a low temperature (e.g., at or about 0° C. or below, −10° C. or below, −20° C. or below, including any specific or range of temperatures comprised within the specified ranges). If the ambient temperature is below a low temperature threshold, such as about −10° C., before reaching the low temperature threshold, the system controller 190 or the one or more fuel cell system or sub-system controllers 123, 125, 127 may enable an auto warm feature to heat the battery pack 162 and/or the fuel cell system or sub-system 122. In some embodiments, the system controller 190 or the one or more fuel cell system or sub-system controllers 123, 125, 127 may alter the operation of the fuel cell powertrain system 100 to increase the state-of-charge (SOC) of the battery pack 162. In other embodiments, the system controller 190 or the one or more fuel cell system or sub-system controllers 123, 125, 127 may alter the operation of the fuel cell powertrain system 100 to maintain a higher charge sustaining state-of-charge (SOC) of the battery pack 162 so that there is reverse battery energy available when the auto warm feature is enabled.

Referring to FIGS. 2 and 3, in one embodiment, heating the battery pack 162, the fuel cell system or sub-system 122, and/or the coolant 252 may comprise the system controller 190 or the one or more fuel cell system or sub-system controllers 123, 125, 127 closing one or more battery contactors and commanding the thermal management system 140 to regulate temperature of the fuel cell powertrain system 100. In other embodiments, heating the battery pack 162, the fuel cell system or sub-system 122, and/or the coolant 252 may comprise the system controller 190 or the one or more fuel cell system or sub-system controllers 123, 125, 127 closing or disconnecting one or more other components of the fuel cell powertrain system 100.

In one embodiment, heating the battery pack 162, the fuel cell system or sub-system 122, and/or the coolant 252 may comprise the system controller 190 or the one or more fuel cell system or sub-system controllers 123, 125, 127 disabling the traction system 150 and the associated differential 158 (see FIGS. 2 and 3). In some embodiments, heating the battery pack 162, the fuel cell system or sub-system 122, and/or the coolant 252 may comprise shutting down the fuel cell system or sub-system 122 or not starting the fuel cell system or sub-system 122. In some other embodiments, heating the battery pack 162, the fuel cell system or sub-system 122, and/or the coolant 252 may comprise the system controller 190 or the one or more fuel cell system or sub-system controllers 123, 125, 127 not disabling the traction system 150 and the associated differential 158 if the state-of-charge (SOC) of the battery pack 162 meets a state-of-charge (SOC) threshold (e.g., a low SOC, a medium SOC, and/or a high SOC).

In some embodiments, the heating the battery pack 162, the fuel cell system or sub-system 122, and/or the coolant 252 may comprise the system controller 190 or the one or more fuel cell system or sub-system controllers 123, 125, 127 not disabling the traction system 150 and the associated differential 158 if the state-of-charge (SOC) of the battery pack 162 meets a low state-of-charge (SOC) threshold. The low state-of-charge (SOC) threshold ranges from about 0% to about 20%, including any specific percentage or range of percentage of charge comprised therein. For example, a low SOC would be a battery and/or fuel cell system that only had about 15% charge.

Any SOC percentage of a battery system outside of this low SOC threshold range (e.g., 0-20%) is considered not low. For example, a medium SOC of a battery and/or battery pack may range from about 21% to about 50%, including any specific percentage or range of percentage of charge comprised therein. A high SOC of a battery and/or battery pack may range from about 51% to about 100%, including any specific percentage or range of percentage of charge comprised therein.

In one embodiment, if the state-of-charge (SOC) of the battery pack 162 is at or below the state-of-charge (SOC) threshold at the end of a drive cycle, the system controller 190 or the one or more fuel cell system or sub-system controllers 123, 125, 127 may autostart the fuel cell system or sub-122 to supplement the state-of-charge (SOC) of the battery pack 162. Charging the battery pack 162 at the end of a drive cycle may ensure that the state-of-charge (SOC) of the battery pack 162 is high enough to assist with the heating of the fuel cell system or sub-system 122 and/or coolant 252 when the ambient temperature starts dropping.

In one embodiment, the system controller 190 or the one or more fuel cell system or sub-system controllers 123, 125, 127 may monitor the ambient temperature. If the ambient temperature drops below a calibratable threshold temperature, the system controller 190 or the one or more fuel cell system or sub-system controllers 123, 125, 127 may automatically start using battery power to keep the battery pack 162 at a temperature at which the battery pack 162 will be able to provide power to heat the fuel cell system or sub-system 122. In some embodiments, the calibratable threshold temperature may be a typical temperature for a cold start, such as about 1° C.

In some embodiments, the calibratable threshold temperature may be lower than the typical temperature a for cold start or lower than a minimum temperature at which battery pack 162 won't be able to provide power to heat the fuel cell system or sub-system 122. In other embodiments, the calibratable threshold temperature may be about −5° C. to about 10° C., including any specific temperature or range comprised therein. In other embodiments, if the energy in the battery pack 162 drops significantly below the calibratable threshold temperature, the fuel cell system or sub-system 122 may start operating and supplement energy to the battery pack 162 to keep it warm.

In one embodiment, the systems and methods described herein reduce the time needed to start a single fuel cell system or sub-system 122 in cold weather conditions. In other embodiments, the present systems and methods efficiently operate the thermal management system 140 in the fuel cell powertrain system 100. The subject systems and methods may also be used or implemented in fuel cell powertrain systems 100 comprising more than one fuel cell systems.

Figure 4:
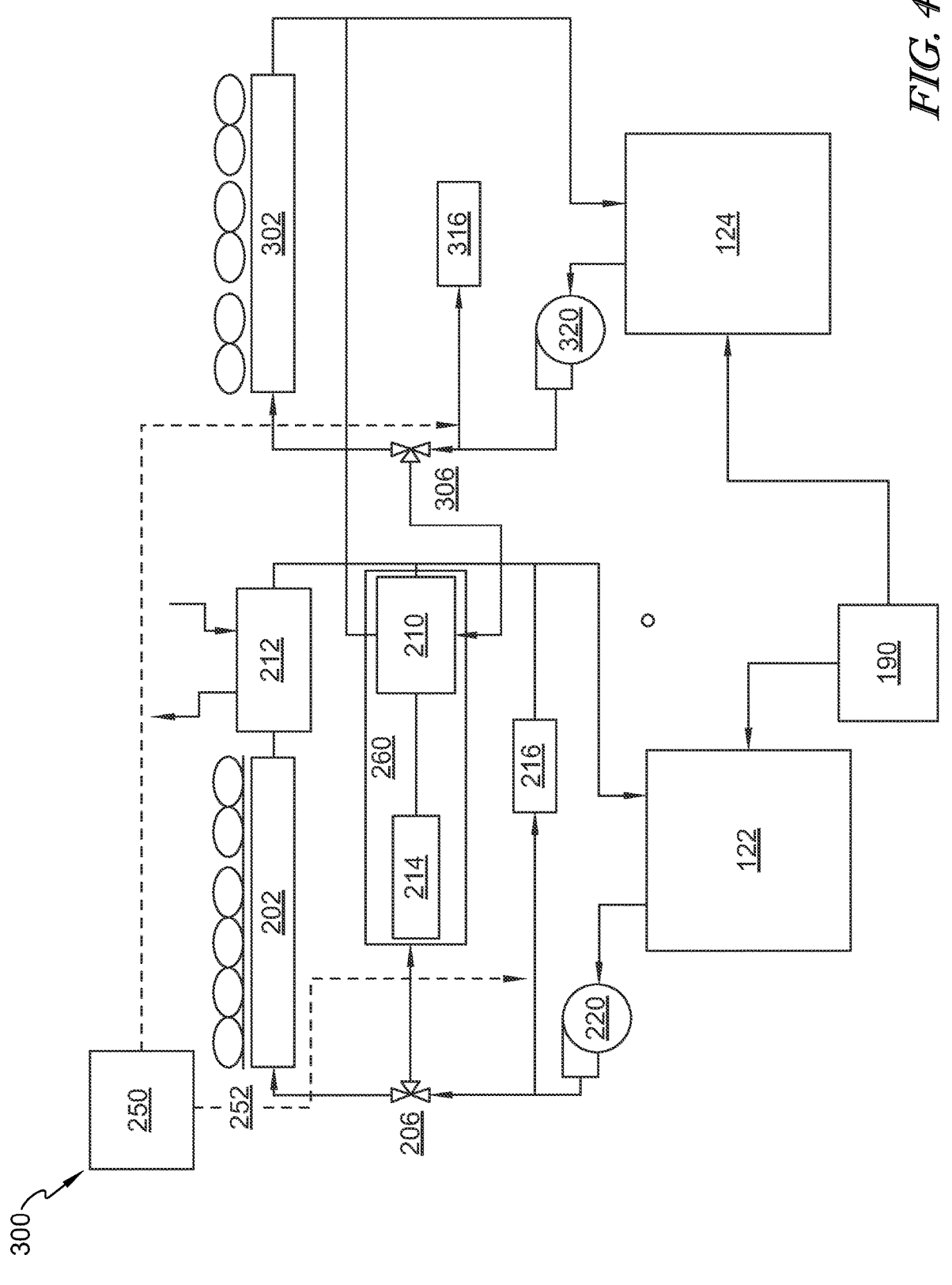
FIG. 4 is a schematic showing one embodiment of a thermal management loop in a fuel cell powertrain system comprising more than one fuel cell system.

In one illustrative embodiment, as shown in FIG. 4, a thermal management loop 300 in a fuel cell powertrain system 100 comprising two fuel cell system or sub-system 122, 124 may comprise one heater 214. The fuel cell systems 122, 124 may each be connected to a radiator 202, 302 through a valve 206, 306 and a pump 220, 320 respectively. The fuel cell system or sub-system 122, 124 may also be connected to a polisher 216, 316 and a pump 220, 320 respectively. In other embodiments, the thermal management loop 300 may comprise less components or more additional components.

In one embodiment, the fuel cell system or sub-system 122 may be connected to a heater 214, which may be further connected to a heat exchanger 210 in a bypass loop that can transfer heat to the fuel cell system or sub-system 122, 124 when needed. In some embodiments, such a configuration avoids requiring a separate heater for each fuel cell system or sub-system 122, 124 in the fuel cell powertrain system 100. In some embodiments, such a configuration may reduce cost and simplify the integration of more than one fuel cell system or sub-system 122, 124 in the fuel cell powertrain system 100. In other embodiments, such a configuration may avoid needing excess power from the battery pack 162 comprised in the fuel cell powertrain system 100 to drive multiple heaters in low temperature conditions. This is especially true in vehicles and/or power train systems 100 associated with mining, trains, locomotives, and/or in other heavy duty applications.

In one embodiment as shown in FIG. 4, power density of the heat exchanger 210 may be higher than an electric heater. In such embodiments, a thermal management loop 300 comprising the heat exchanger 210 may operate more efficiently. In some embodiments, instead of rejecting heat into the surroundings, environment, or atmosphere, the heat generated by the fuel cell system or sub-system 122 may be used to assist in the cold start of the other fuel cell system or sub-system 124 in the fuel cell powertrain system 100.

In some embodiments of a fuel cell powertrain system 100 comprising more than one fuel cell system or sub-system 122, 124, a sequential cold start heating assistance may be provided for fuel cell system or sub-system 122, 124. In other embodiments, a simultaneous cold start heating assistance may be provided for fuel cell system or sub-system 122, 124. In some other embodiments, where the fuel cell powertrain system 100 comprise multiple fuel cell system or sub-system, the heat rejected from one fuel cell system or sub-system 122 may be used to heat the coolant associated with more than one of the other fuel cell system or sub-system 124 simultaneously or sequentially.

Referring back to FIG. 4, when the valves 206, 306 are set to bypass mode, the pump 220 may be turned on to achieve the flow rate required by the fuel cell powertrain system 100. Pump 320 may be turned off. In other embodiments, the heater 214 may be turned on and the heater 214 may provide power over a calibratable period of time. In some embodiments, the heater 214 may provide a maximum power (e.g., about 20 kW) over a calibratable period of time. In some embodiments, the calibratable period of time may range from about 1 min to about 5 min, including any specific time period or range comprised therein.

In one embodiment, the fuel cell system or sub-system 122 may start operating once the temperature of the coolant 252 associated with the fuel cell system or sub-system 122 is in the range of about 2° C. to about 10° C., or any specific or range of temperature comprised therein. In other embodiments, once the fuel cell system or sub-system 122 starts operating, the pump 320 may be turned on. In one embodiment, once the fuel cell system or sub-system 122 starts operating, the fuel cell system or sub-system 122 may reject heat to the heat exchanger 210. The heat exchanger 210 may heat the coolant 352 associated with the fuel cell system or sub-system 124 and/or coolant 252 associated with the fuel cell system or sub-system 122 (see FIG. 4).

In one embodiment, if the temperature of the coolant 252 and/or of the components in the thermal management loop 300 associated with the fuel cell system or sub-system 122 is above a certain threshold (e.g., about 20° C.), the valve 206 may be opened slightly to allow the mixing of cold coolant from the radiator 202 with the warm coolant while the heat exchanger 210 may continue to heat up fuel cell system or sub-system 124 and/or coolant 352. In some embodiments, once the fuel cell system 124 is in the range of about 2° C. to about 10° C., valves 206, 306 maybe slowly moved back to their nominal positions. In some embodiments, the nominal position of the valves 206, 306 are the positions when the valves 206, 306 are not bypassing the coolant 252, 352 to the heater 214 and are instead routing the coolant to the radiators 202, 302.

In one embodiment shown in FIG. 4, the present disclosure comprises a method for balancing heat rejection between more than one fuel cell systems or sub-systems 122, 124, 126 comprised in a fuel cell powertrain system 100. In some embodiments, if the vehicle comprising the fuel cell powertrain system 100 is a bobtail in a city requiring only a small amount of power or is a mining truck idling in a queue waiting to dump load, one or more of the fuel cell systems or sub-systems 122, 124, 126 on board the fuel cell powertrain system 100 may shutdown to increase the efficiency of the fuel cell powertrain system 100. In some embodiments, if one or more of the fuel cell systems or sub-systems 122, 124, 126 shutdown to increase the efficiency of the fuel cell powertrain system 100, the coolant associated with fuel cell systems that have been shut down may get colder.

To increase the efficiency of the fuel cell powertrain system 100, the heat from the fuel cell system that is operating may be rejected to the coolant associated with the fuel cell systems that have been shut down. In one embodiment, the fuel cell system or sub-system 122, 124, 126 may be shut down. In other embodiments, fuel cell systems or sub-systems 122, 124, or fuel cell systems or sub-systems 124, 126, or fuel cell systems or sub-systems 122, 126 may be shut down. Transfer of heat between each of the fuel cell systems or sub-systems may keep the coolant associated which each fuel cell system warm so that the fuel cell systems or sub-systems that have been shut down may start up in less time. Keeping the coolant associated which each fuel cell system warm may enable the fuel cell powertrain system 100 to achieve peak power is less time.

Figure 5:
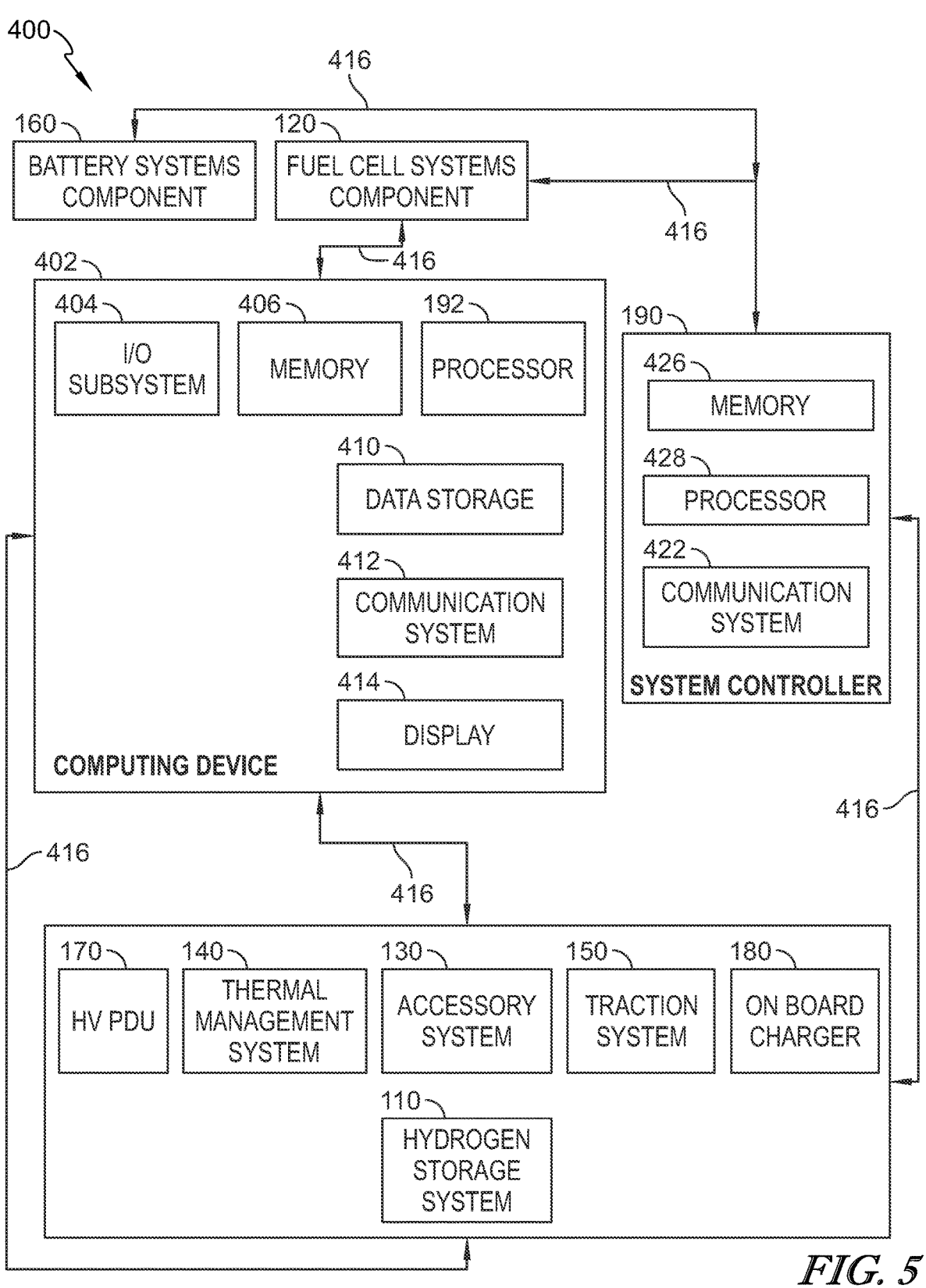
FIG. 5 is a schematic showing a method, process, strategy, and/or algorithm for regulating the temperature of a fuel cell system and/or a battery pack in the fuel cell powertrain system.

FIG. 5 illustrates a schematic of one embodiment of a method, process, strategy, and/or algorithm 400 to regulate the temperature of the fuel cell systems or sub-systems 122, 124, 126 and/or the battery pack 162 in the fuel cell powertrain system 100. In some embodiments, to facilitate the transfer of data and other network communications across the fuel cell powertrain system 100, the system controller 190 or the one or more fuel cell system or sub-system controllers 123, 125, 127 may be in communication with a computing device 402 comprising a processor 192 over a network 416. The communication device 402 may be in communication with other components of the fuel cell powertrain system 100 including but not limited to the hydrogen storage system 110, the high voltage power drive unit 170, the thermal management system 140, the accessory system 130, the traction system 150, and/or the on board charger 180. In some embodiments, the system controller 190 may include a memory 426, a processor 428, and/or a communication subsystem 422. In some embodiments, the one or more fuel cell system or sub-system controllers 123, 125, 127 may include memory, a processor, and/or a communication subsystem (not shown).

The computing device 402 may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

The illustrative computing device 402 of FIG. 5 may include one or more of an input/output (I/O) subsystem 404, a memory 406, a processor 192, a data storage device 410, a communication subsystem 412, and a display 414 that may be connected to each other, in communication with each other, and/or configured to be connected and/or in communication with each other through wired, wireless and/or power line connections and associated protocols (e.g., Ethernet, InfiniBand®, Bluetooth®, Wi-Fi®, WiMAX, 3G, 4G LTE, 5G, etc.).

In one embodiment, the processor 192 in the computing device 402 may identify, determine, and/or optimize strategies or algorithms for optimizing the power split between the fuel cell systems component 120 and/or the battery system component 160 in a fuel cell powertrain system 100. The processor 192 may communicate the strategies or algorithms for optimizing the power split between the fuel cell systems or sub-systems 122, 124, 126 and/or battery pack 162 to the system controller 190 or the one or more fuel cell system or sub-system controllers 123, 125, 127 over the network 416.

The computing device 402 may also include additional and/or alternative components, such as those commonly found in a computer (e.g., various input/output devices). In other embodiments, one or more of the illustrative computing device 402 of components may be incorporated in, or otherwise form a portion of, another component. For example, the memory 406, or portions thereof, may be incorporated in the processor 192.

The processors 192, 428 may be embodied as any type of computational processing tool or equipment capable of performing the functions described herein. For example, the processor 192, 428 may be embodied as a single or multi-core processor(s), digital signal processor, microcontroller, or other processor or processing/controlling circuit. The memory 406, 426 may be embodied as any type of volatile or non-volatile memory or data storage capable of performing the functions described herein (see FIG. 4).

In operation, the memory 406, 426 may store various data and software used during operation of the computing device 402 and/or system controller 190 such as operating systems, applications, programs, libraries, and drivers. The memory

406 is communicatively coupled to the processor 192 via the I/O subsystem 404, which may be embodied as circuitry and/or components to facilitate input/output operations with the processor 192, the memory 406, and other components of the computing device 402.

For example, the I/O subsystem 404 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations.

In one embodiment, the memory 406 may be directly coupled to the processor 192, for example via an integrated memory controller hub. Additionally, in some embodiments, the I/O subsystem 404 may form a portion of a system-on-a-chip and be incorporated, along with the processor 192, the memory 406, and/or other components of the computing device 402, on a single integrated circuit chip (not shown).

The memory 426 is communicatively coupled to the processor 428 which may be embodied as circuitry and/or components to facilitate input/output operations with the processor 428, the memory 426, and other components of the system controller 190. In one embodiment, the memory 426 may be directly coupled to the processor 428. In some components the processor 428 may perform the functions of the processor 192. In other embodiments, the system controller may comprise the computing device 402.

The data storage device 410 may be embodied as any type of device or devices configured for short-term or long-term storage of data such as, for example, memory devices and circuits, memory cards, hard disk drives, solid-state drives, or other data storage devices. The computing device 402 also includes the communication subsystem 412, which may be embodied as any communication circuit, device, or collection thereof, capable of enabling communications between the computing device 402 and other remote devices over the computer network 416.

The components of the communication subsystem 412 may be configured to use any one or more communication technologies (e.g., wired, wireless and/or power line communications) and associated protocols (e.g., Ethernet, InfiniBand®, Bluetooth®, Wi-Fi®, WiMAX, 3G, 4G LTE, 5G, etc.) to effect such communication among and between system components and devices.

The system controller 190 may be connected and/or in communication with the computing device 402, the fuel cell system component 120, the battery system component 160, the other components of the fuel cell powertrain system 100, and additional features or components (not shown) of the vehicle comprising the fuel cell powertrain system 100. The above mentioned components may be connected, communicate with each other, and/or configured to be connected or in communication with each over the network 416 using one or more communication technologies (e.g., wired, wireless and/or power line communications) and associated protocols (e.g., Ethernet, InfiniBand®, Bluetooth®, Wi-Fi®, WiMAX, 3G, 4G LTE, 5G, etc.

The display 414 of the computing device 402 may be embodied as any type of display capable of displaying digital and/or electronic information, such as a liquid crystal display (LCD), a light emitting diode (LED), a plasma display, a cathode ray tube (CRT), or other type of display device. In some embodiments, the display 414 may be coupled to or otherwise include a touch screen or other input device.

The computing device 402 may also include any number of additional input/output devices, interface devices, hardware accelerators, and/or other peripheral devices. The computing device 402 may be configured into separate subsystems for managing data and coordinating communications throughout the fuel cell powertrain system 100. In some embodiments, the computing system 402 may be a part of the system controller 190.

The following described aspects of the present invention are contemplated and non-limiting:

A first aspect of the present invention relates to a method of heating a fuel cell system comprised in a fuel cell powertrain system which further comprises a thermal management system. The method includes the steps of identifying the need to heat the fuel cell system by a system controller or by one or more fuel cell sub-system controllers that communicate with each other, identifying the state-of-charge in a battery comprised in the fuel cell powertrain system, heating coolant associated with the fuel cell system by a heater, and decreasing the time to heat the fuel cell system.

In the first aspect of the present invention, identifying the need to heat the fuel cell system may include determining the ambient temperature. In the first aspect of the present invention, identifying the need to heat the fuel cell system may be automatic. In the first aspect of the present invention, identifying the need to heat the fuel cell system comprises a remote warm-up feature. In the first aspect of the present invention, heating the fuel cell system may include maintaining a charge sustaining state-of-charge in the battery.

In the first aspect of the present invention, heating the fuel cell system may include heating the battery. In the first aspect of the present invention, heating the coolant associated with the fuel cell system may include the system controller closing one or more battery contactors to bring high voltage live on the powertrain. In the first aspect of the present invention, heating the fuel cell system may include the system controller commanding a battery warm-up system to regulate temperature.

In the first aspect of the present invention, heating the fuel cell system may include the system controller disabling a traction system in the fuel cell powertrain system if the state-of-charge in the battery is not low. In the first aspect of the present invention, heating the fuel cell system may include the system controller not starting the fuel cell system if the state-of-charge in the battery is not low.

In the first aspect of the present invention, heating the fuel cell system may include supplementing battery state-of-charge if the state-of-charge in the battery is low. In the first aspect of the present invention, the fuel cell powertrain system may include more than one fuel cell system and one heater. In the first aspect of the present invention, heating the fuel cell system may include heating coolant associated with the first fuel cell system by the heater and operating the first fuel cell system when the temperature of the coolant is about 2° C. to about 10° C. In the first aspect of the present invention, operating the first fuel cell system may include using heat rejected by the first fuel cell system for heating coolant associated with a second fuel cell system through a heat exchanger.

A second aspect of the present invention relates to a fuel cell powertrain system having more than one fuel cell system, one heater, at least one heat exchanger, and a thermal management system. In the second aspect of the present invention, a first fuel cell system is associated with a first coolant and a second fuel cell system is associated with a second coolant. In the second aspect of the present invention, the heat generated from operating the first fuel cell system may be used to heat the second fuel cell system during cold start. In the second aspect of the present invention, a heat exchanger may be used to heat the second fuel cell system. In the second aspect of the present invention, the fuel cell powertrain system may include a battery pack.

In the second aspect of the present invention, the thermal management system may include a radiator and a polisher. In the second aspect of the present invention, the thermal management system may include a pump which, when turned on, would allow the powertrain system achieve a desired flow rate. In the second aspect of the present invention, the thermal management system may include a coolant reservoir for storing coolant. In the second aspect of the present invention, the thermal management system may include a second heat exchanger.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments and aspects are described in sufficient detail to enable those skilled in the art to practice what is claimed and it is to be understood that other embodiments may be utilized and that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A fuel cell powertrain system comprising,
more than one fuel cell system, and
a heating assist system including one heater connected to at least one heat exchanger in a bypass loop,
herein a first fuel cell system is associated with a first coolant and a second fuel cell system is associated with a second coolant, and wherein heat generated from operating the first fuel cell system is used to heat the second fuel cell system during a cold start.

2. The system of claim 1, wherein a first heat exchanger of the first fuel cell system is used to heat the second fuel cell system.

3. The system of claim 1, wherein the system further comprises a battery.

4. The system of claim 3, wherein system further comprises a system controller configured to command a battery warm-up system to regulate temperature.

5. The system of claim 4, wherein system further comprises a system controller configured to supplementing battery state-of-charge when the state-of-charge of the battery is low.

6. The system of claim 1, wherein the system further comprises a radiator and a polisher.

7. The system of claim 6, wherein the system further comprises a pump that is operable to achieve a desired flow rate in the powertrain system.

8. The system of claim 7, wherein the system further comprises a coolant reservoir for storing the first coolant or the second coolant.

9. The system of claim 6, wherein the system further comprises a second heat exchanger.

10. The system of claim 6, wherein a power density of the heat exchanger is higher than that of the heater.

11. The system of claim 1, wherein the system is operable to transfer heat from the first fuel cell system to the second fuel cell system that has been shutdown.

* * * * *